Jan. 19, 1960   A. GREENBAUM   2,921,994
RETRACTIBLE REEL ASSEMBLY FOR ELECTRIC RAZORS
Filed May 16, 1955   2 Sheets-Sheet 1
FIG.I.
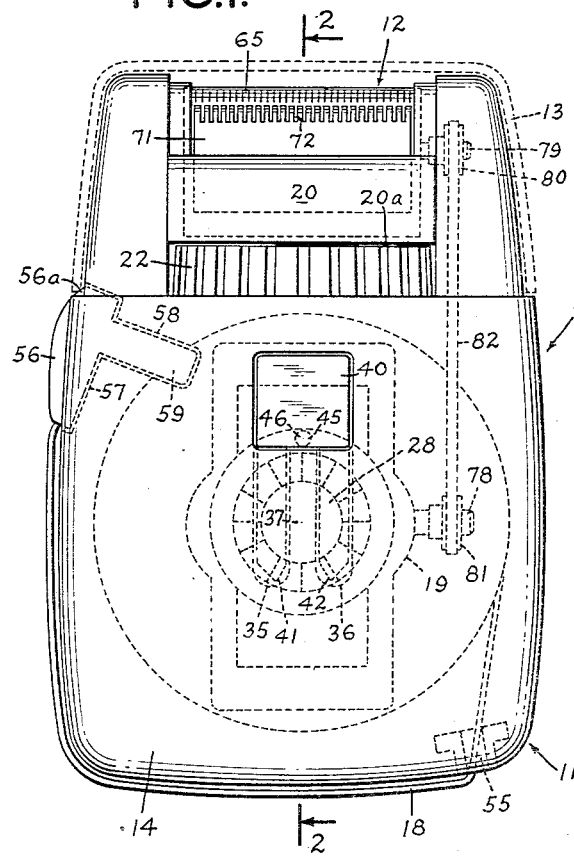
FIG.2.
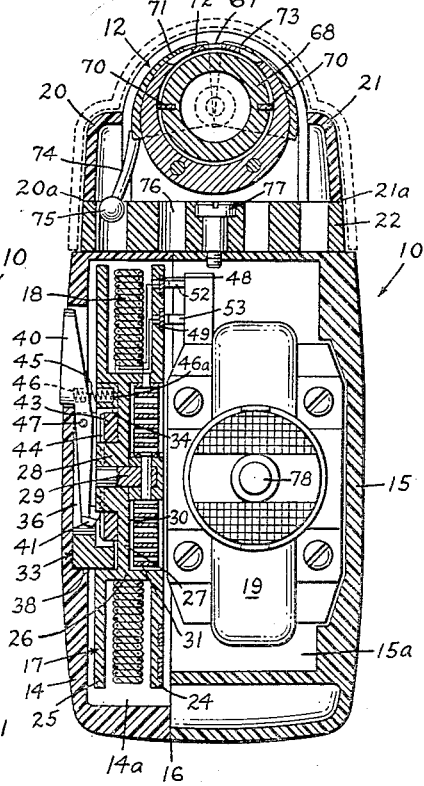
FIG.3.
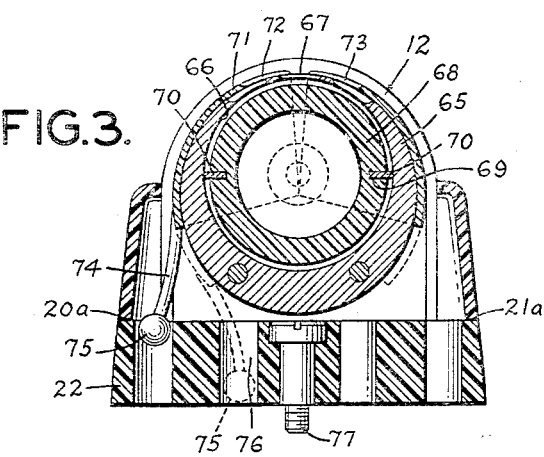
INVENTOR
ARTHUR GREENBAUM
BY
HIS ATTORNEYS Jan. 19, 1960   A. GREENBAUM   2,921,994
RETRACTIBLE REEL ASSEMBLY FOR ELECTRIC RAZORS
Filed May 16, 1955   2 Sheets-Sheet 2

INVENTOR
ARTHUR GREENBAUM
BY
HIS ATTORNEYS

United States Patent Office 2,921,994
Patented Jan. 19, 1960

2,921,994
RETRACTIBLE REEL ASSEMBLY FOR ELECTRIC RAZORS

Arthur Greenbaum, Tuckahoe, N.Y., assignor to Jet Electric Shaver Corporation, New York, N.Y., a corporation of New York Application May 16, 1955, Serial No. 508,616

5 Claims. (Cl. 191—12.4)

This invention relates to improvements in shaving devices and it relates particularly to an improved type of electric shaving device or dry shaver having a novel arrangement of the electric cord thereon to facilitate its use and render it more convenient.

Heretofore, an electric shaving device of the dry shaver type has been provided with a separate electrical conductor or cord by means of which the dry shaver is connected to an electrical outlet or socket. The cords for different dry shavers are made in different styles so that when a cord becomes damaged, it is not always convenient or possible to find a suitable replacement. The same situation prevails when the cord is misplaced, forgotten or lost, as occurs frequently. Moreover, because a cord is separate, it frequently is left behind when the shaver is packed for travelling. Accordingly, when the shaver is to be used, the cord is not available and the shaving device is useless, thereby causing considerable annoyance and inconvenience.

In accordance with the present invention, I have provided an electric shaving device or dry shaver which has a self-contained electric cord or conductor that can be withdrawn readily to enable the device to be connected to a convenient socket or electrical outlet. The cord is readily retracted into the shaver thereby doing away with the need to coil or fold the cord manually.

More particularly, the electrical cord or conductor is mounted on a reel disposed within the handle or casing of the shaving device so that the cord can be withdrawn through an opening in the handle for plugging into an outlet. The reel is biased by means of a spring so that it normally tends to wind the electrical cord on the reel for storage. Suitable means is provided for retaining the cord in any of its extended positions so that interference with the operation of the shaver by tension on the cord is completely avoided. Moreover, the cord is mounted in such a manner and is of such construction that kinking or twisting of the cord is largely avoided and any twists that may occur due to rotation of the shaving device during use are untwisted during the recoiling of the cord onto the reel.

The handle or casing of the shaver also affords means for storing the plug on the end of the cord until ready for use.

The above-described improvements completely eliminate any possibility of the cord being lost or forgotten because the cord forms a part of the shaving device and is always carried along with it. The reel with the cord thereon is housed in the shaver in such a manner that it does not materially increase the over-all size of the dry shaver or render it inconvenient for use.

For a better understanding of the present invention, reference may be had to the accompanying drawings in which:

Fig. 1 is a front view of a typical shaving device or dry shaver embodying the present invention and illustrating the electrical cord or conductor in its stowed position;

Fig. 2 is a view in section taken on line 2—2 of Fig. 1;

Fig. 3 is an enlarged view in cross-section of a typical shaving head for the dry shaver, the shaving head being shown with parts removed to disclose details thereof;

Figure 5:
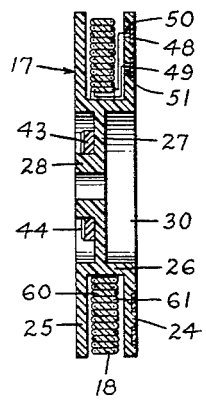
Fig. 5 is a view in section taken on line 5—5 of Fig. 4.
Figure 4:
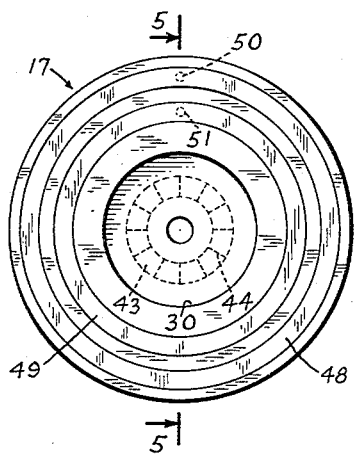
Fig. 4 is a plan view of the reel for the electrical cord.

The form of shaving device chosen for purposes of illustration may have a shaving head of substantially any desired type. Thus, for example, the shaving head may be of the reciprocating cutter bar type, the rotary reel type, or the rotary blade type, as may be desired. However, the present invention will be described with reference to use of a rotary reel type of cutting blade having an adjustable guard therefor.

Referring to Figs. 1 and 2, a typical dry shaver 10 embodying the present invention includes a handle or casing 11 on which is mounted the shaving head 12 and having a detachable cover 13 (shown in dotted lines) for covering the shaving head 12. The handle 11 consists of a two-part casing having the casing sections 14 and 15 that may be formed of plastic or any other suitable material. The casing sections 14 and 15 are hollow to provide the recesses 14a and 15a therein which are, as shown in Fig. 2, of different depths. That is, the casing section 14 is shallower than the casing section 15 and they meet at a parting line 16 which is offset to one side of the center line of the casing.

As illustrated in Fig. 2, the casing section 14 is adapted to receive a reel 17 on which is wound an electric conductor 18 to be described in greater detail hereinafter. The casing section 15 houses the electric motor 19 for driving the shaving head, the motor being illustrated as having a rotary armature although it will be understood that it can be of the oscillating or vibrating type, if desired.

On the upper end of the handle are inwardly extending shell portions 20 and 21 which bear against the sides of the shaving head 12 and cover it at least partially. Mounted between the casing sections 14 and 15 and extending through the slots 20a and 21a in the shell portions 20 and 21 is a rotary cam disk 22 by means of which the shaving head can be adjusted, as will be described hereinafter.

Referring now to Figs. 2, 4, 5 and 6 of the drawings, it will be seen that the reel 17 is a disk-like member formed of plastic or other moldable insulating material having outer spaced peripheral flanges 24 and 25 between which the electrical cord 18 is wound in spiral fashion around a cylindrical seat 26. The cylindrical seat or body portion of the reel 17 is supported on a disk-like web 27 having a centrally located hub 28 to receive a pivot or axle 29, as shown in Fig. 2. On the opposite side of the disk-shaped portion 27 is a recess 30 in which is received a long, loosely wound spiral spring 31 which is secured at its inner end to the axle 29 and at its outer end to the reel 17. The spring 31 is wound up by withdrawing the electrical cord 18 from the handle 10 and thus rotating the reel 17. As shown in Fig. 2, the spring-receiving recess 30 is on the inside face of the reel 17 when it is assembled in the handle.

Figure 6:
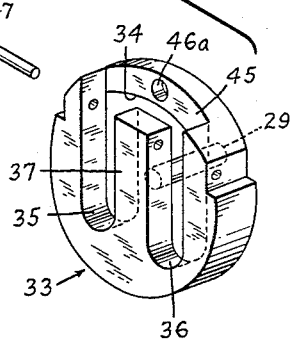
Fig. 6 is an exploded view of a detail of the device including the means for latching the reel for the electrical cord in a partially unwound condition and a support for the reel.

The axle 29 forms a part of a locking and supporting assembly that is shown in Figs. 2 and 6 of the drawings and includes a generally disk-like member 33 which has formed in its inner surface a circular recess 34 to receive the hub 28 of the reel rotatably. A pair of parallel slots 35 and 36 extend across the opposite side of the member 33 and intersect the recess 34 and thus provide openings completely through the disk 33 and an interposed solid arm 37 on which the axle 29 is fixed. Thus, when the member 33 is secured in a circular recess 38 in the inside of the casing section 14 by means of screws, cement or the like, it provides a support for the reel 17 and also a recess to receive the hub of the reel and thereby enable the reel to be brought up close to the inner wall of the casing section 14.

The member 33 further serves as a support for a push button 40, shown in Figs. 1, 2 and 6, by means of which the reel can be locked in position with the cord 18 partially or completely unwound therefrom and which can be released to allow the spring 31 to rewind the cord on the reel. The push button 40 has a pair of pawl members 41 and 42 extending downwardly therefrom into the slots 35 and 36 and into engagement with a ring 43 forming a part of or concentric with the hub 28. As shown in Fig. 5, the ring 43 has a plurality of ratchet teeth or serrations 44 formed thereon to be engaged by the ends of the pawls 41 and 42 shown in Fig. 1 to thereby restrain the reel against rotation. The pawls 41 and 42 are normally retained in engagement with the ratchet teeth 44 by means of a helical spring 45 interposed between the disk member 33 and the inner face of the push button 40. Recesses 46 and 46a are provided in the disk member and the push button member to receive and position the spring 45. The push button 40 is pivotally connected to the member 33 by means of a pivot pin 47 which passes through holes in the pawls 41 and 42 and through the sides of the member 33 and its arm 37.

The push button 40 enables the cord 18 to be drawn out of the casing by unwinding from the reel 17 but prevents reverse rotation of the reel by the spring 31 unless the push button 40 is depressed.

Inasmuch as the electrical cord 18 is carried at all times by the shaving device, means are provided for connecting the inner end of the electrical cord to the motor 19. This may be accomplished by providing the inner face of the reel 17 with a pair of commutator or slip rings 48 and 49 which are connected to the two conductors of the electric cord by means of wires and conductive plugs mounted in the openings 50 and 51 in the side wall 24 of the reel. The rings 48 and 49 are engaged by means of brushes 52 and 53 (Fig. 2) mounted on the housing of the motor 19, these brushes being connected suitably in the motor circuit to enable operation thereof.

As shown in Fig. 1, the electrical cord or conductor 18 extends downwardly from the reel through a narrow slot 55 near the lower right-hand corner of the handle 10, and it is adapted to be stored when not in use by wrapping it around the bottom of the shaver and up the left-hand side, as shown in Fig. 1. Rollers may be positioned at opposite sides of the slot 55 to engage and facilitate withdrawal and return of the cord. To hold the cord and the plug 56 on its end in neatly stored condition, the housing is provided with a recess 57 having an inclined bottom 58 and a pair of deep notches 59 for receiving the plug contacts. When stowed, the plug has its outermost corner 56a in such position that the cover 13 engages over it and thereby prevents the plug from dropping or from being pulled out until the cover 13 is removed.

Figure 7:
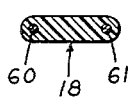
Fig. 7 is a view in section of a typical electrical cord for use in the electric shaver device.

The cord 18 is a very thin and pliable member such as that shown in Fig. 7, in which two small and highly flexible wires or cables 60 and 61 are disposed adjacent the outer edges of a thin ribbon of insulating material. The over-all thickness of the ribbon should be on the order of .050 to .062 inch and the over-all width of the cord should be about one-quarter inch to three-eighths of an inch. Such a thin cable enables four or five feet of it to be wound on a reel of convenient size without making the handle of the shaving device at all bulky or inconvenient to use. A thin, flat cord of the kind described is substantially kinkless in use and any kinks or twists that might be formed in the cord are removed as the cord passes through the slot 55 and is wound on the reel.

By using a thin spring 31 of relatively low tension, it is possible to have four or five feet of spring in the recess 30 to enable the cord to be drawn out substantially completely.

As indicated above, the type of shaving head used in the apparatus is susceptible to considerable modification and the invention is not dependent upon the specific kind of head disclosed herein or to be in the system. As shown in Fig. 3, a suitable head includes a shearing head 65 having an eccentric bore 66 therein rendering the base of the member 65 relatively thick and its diametrically spaced portion 67 extremely thin. The thin portion of the head is provided with parallel rows of short circumferential slots to form the guard and outer shearing member of the shaving head. Rotatably mounted in the shearing head portion 65 is a cutter 68 of hollow, cylindrical cross-section having a plurality of radial slots 69 therein to receive the straight edged cutting blades 70 which are urged outwardly against the inner surface of the shearing head portion 65 by means of centrifugal force and/or light springs (not shown). The shaving head has a supplemental guard 71 mounted thereon consisting of a semicylindrical member providing a plurality of opposed combs or teeth 72 and 73 which decrease in thickness towards their opposed edges. The guard member 71 is mounted for rotation around the head portion 65 and can be moved to cover and expose the shearing portions thereof by means of a downwardly extending arm 74 having a cam follower 75 thereon. The cam ring or disk 22 referred to above, is used to oscillate and adjust the position of the guard 71 by means of a spirally arranged cam slot 76 therein in which the cam follower ball 75 is received. Thus, by rotating the cam disk 22, the guard 71 can be moved circumferentially around the head portion 65 to expose portions of the slots through the head at zones of different thickness of the head to thereby regulate the length of the hairs to be cut by the blade. As shown in Fig. 2, the cam disk 22 is supported by means of a headed screw 77 which is threaded into the upper portion of the casing section 15.

Inasmuch as the drive shaft 78 of the motor and the drive shaft 79 for the rotary cutting member 68 are parallel, they both may be provided with pulleys 80 and 81, respectively, which are connected by means of a lightweight drive belt 82, such as a rubber band or the like, to drive the cutter from the motor.

It will be understood that electric shavers of the type described are susceptible to considerable variation in their size and ornamental appearance and other structural details and dimensions. Thus, the cord reel and associated structure may be used in other types of shaving devices and may be positioned transversely of the axis of the handle rather than parallel therewith as indicated herein. Accordingly, the above-described embodiment of the invention should not be considered as restricting the claims to the form of the invention shown.

I claim:

1. A conductor reel assembly suitable for mounting within the casing of an electric razor comprising a relatively thin reel having spaced peripheral flanges on a cylindrical body portion, a disc-like web supporting the body portion and having ratchet teeth thereon, a hub and a pivot, the hub located centrally on the web to receive the pivot, a dual wire conductor attached at one end to said reel, the other end of said conductor extending through said casing and having a plug on the outside end thereof to be received by an electrical outlet, means normally biasing the reel in a direction to wind the conductor thereon, electrical connections on said reel between said conductor and adapted to be connected to a motor, and a manually releasable reel-locking assembly, said reel-locking assembly comprising a push button member and a support member, said push button member extending through the casing and having at least one depending pawl member arranged to releasably engage the ratchet teeth on the web, and said support member supporting the pivot of the reel and the push button member.

2. A conductor reel assembly suitable for mounting within the casing of an electric razor comprising a support member, a pivot shaft fixed thereto, a reel having spaced peripheral flanges on a cylindrical body portion, a disc-like web supporting the body portion and having ratchet teeth thereon, and a hub located centrally on the web and rotatably mounted on the pivot shaft, and a manually releasable reel-locking assembly comprising a push button member having at least one depending pawl member thereon, said push button member mounted on said support member and arranged so that the depending pawl member releasably engages said ratchet teeth.

3. The conductor reel assembly of claim 2 wherein the disc-like web is centrally disposed on the cylindrical body portion and the hub to provide two annular recesses in said reel, one of said recesses arranged to receive means normally biasing the reel in a direction to wind the conductor thereon and the other of said recesses arranged to receive the support member, and a ring of said ratchet teeth, said support member having an opening therein to permit engagement of the pawl member with said ratchet teeth.

4. The conductor reel assembly of claim 2 wherein said support member supporting said pivot and said push button member has a circular recess on its inner surface to rotatably receive said hub, and wherein said electrical connections on said reel comprise a pair of conducting slip rings on the inner face of the inner peripheral flange of said reel.

5. The conductor reel assembly of claim 2 wherein the means normally biasing the reel in a direction to wind the conductor thereon comprises a spring attached at one end to said pivot shaft and at the other end to said reel.

References Cited in the file of this patent

UNITED STATES PATENTS

| | | |
|---|---|---|
| 1,978,734 | Apple et al. | Oct. 30, 1934 |
| 2,013,733 | Murphy | Sept. 10, 1935 |
| 2,096,379 | Peak | Oct. 19, 1937 |
| 2,135,739 | Todd | Nov. 8, 1938 |
| 2,460,082 | Gray | Jan. 25, 1949 |
| 2,474,899 | Hutt | July 5, 1949 |
| 2,508,071 | Martin et al. | May 16, 1950 |
| 2,514,628 | Cortes | July 11, 1950 |
| 2,565,452 | Johnson et al. | Aug. 21, 1951 |
| 2,590,890 | Redo | Apr. 1, 1952 |
| 2,688,184 | Jepson | Sept. 7, 1954 |
| 2,780,864 | Kleinman | Feb. 12, 1957 |
| 2,787,053 | Kleinman | Apr. 2, 1957 |